United States Patent
Liu

(10) Patent No.: US 9,922,389 B2
(45) Date of Patent: Mar. 20, 2018

(54) RICH FEATURE MINING TO COMBAT ANTI-FORENSICS AND DETECT JPEG DOWN-RECOMPRESSION AND INPAINTING FORGERY ON THE SAME QUANTIZATION

(71) Applicant: Sam Houston State University, Huntsville, TX (US)

(72) Inventor: Qingzhong Liu, Huntsville, TX (US)

(73) Assignee: Sam Houston State University, Huntsville, TX (US)

( * ) Notice: Subject to any disclaimer, the term of this patent is extended or adjusted under 35 U.S.C. 154(b) by 0 days.

(21) Appl. No.: 14/735,921

(22) Filed: Jun. 10, 2015

(65) Prior Publication Data

US 2016/0132985 A1    May 12, 2016

Related U.S. Application Data

(60) Provisional application No. 62/010,423, filed on Jun. 10, 2014, provisional application No. 62/043,976, filed on Aug. 29, 2014.

(51) Int. Cl.
   *G06K 9/00*     (2006.01)
   *G06K 9/46*     (2006.01)
   (Continued)

(52) U.S. Cl.
   CPC .... *G06T 1/0028* (2013.01); *G06T 2201/0051* (2013.01); *G06T 2201/0081* (2013.01); *G06T 2201/0201* (2013.01)

(58) Field of Classification Search
   CPC ... G06T 1/0021; G06T 1/0028; G06T 1/0035; G06T 1/0042
   See application file for complete search history.

(56) References Cited

U.S. PATENT DOCUMENTS

| | | | |
|---|---|---|---|
| 7,424,464 B2* | 9/2008 | Oliver | G06K 9/6297 704/E15.029 |
| 8,281,138 B2* | 10/2012 | Shi | G06T 1/0028 380/28 |

(Continued)

OTHER PUBLICATIONS

Liu Qingzhong et al. ("Shift recompression based feature mining for detecting content aware scaled forgery in JPEG images", 2012, hereafter Liu2).*
Liu ("Steganalysis of DCT Embedding Based Adaptive Steganography and YASS", 2011).*
Kodovsky et al. ("Ensemble classifiers for Steganalysis of Digital Media", 2012).*

(Continued)

*Primary Examiner* — Avinash Yentrapati
(74) *Attorney, Agent, or Firm* — Meyertons, Hood, Kivlin, Kowert & Goetzel, P.C.; Mark R. DeLuca

(57) ABSTRACT

A method of detecting tampering in a compressed digital image includes extracting one or more neighboring joint density features from a digital image under scrutiny and extracting one or more neighboring joint density features from an original digital image. The digital image under scrutiny and the original digital image are decompressed into a spatial domain. Tampering in the digital image under scrutiny is detected based on at least one difference in a neighboring joint density feature of the digital image under scrutiny and a neighboring joint density feature of the original image. In some embodiments, detecting tampering in the digital image under scrutiny includes detecting down-recompression of at least a portion of the digital image. In some embodiments, detecting tampering in the digital image includes detecting inpainting forgery in the same quantization.

15 Claims, 6 Drawing Sheets

(51) Int. Cl.
*G06K 9/40* (2006.01)
*G06T 1/00* (2006.01)

(56) References Cited

U.S. PATENT DOCUMENTS

| | | | |
|---|---|---|---|
| 8,965,038 B2 | 2/2015 | Liu | |
| 2003/0072364 A1 | 4/2003 | Kim et al. | |
| 2003/0169456 A1* | 9/2003 | Suzaki | G06T 1/0028 358/3.28 |
| 2010/0037059 A1 | 2/2010 | Sun et al. | |
| 2012/0095982 A1* | 4/2012 | Lennington | G06F 17/30247 707/706 |
| 2013/0208941 A1* | 8/2013 | Liu | G06T 1/0021 382/100 |
| 2016/0132985 A1* | 5/2016 | Liu | G06T 1/0028 382/112 |

OTHER PUBLICATIONS

Liu Qingzhong et al. ("Shift recompression based feature mining for detecting content aware scaled forgery in JPEG images", 2012).*
Pevny et al., "Merging Markov and DCT Features for Multi-Class JPEG Steganalysis", Electronic Imaging 2007, International Society for Optics and Photonics, 2007, 13 pages. [accessed Dec. 15, 2015].
Kodovsky et al., "Calibration Revisited", Proceedings of the 11th ACM Multimedia and Security Workshop, Princeton, NJ, Sep. 7-8, 2009, 11 pages.
Kodovsky, "Modern Steganalysis Can Detect YASS", Electronic Imaging, Media Forensics and Security XII, San Jose, CA, Jan. 17-21, 2010, 11 pages.
Li et al., "Steganalysis of YASS", IEEE Transactions on Information Forensics and Security, vol. 4, Issue 3, Sep. 1, 2009, 10 pages.
Notice of Allowance, U.S. Appl. No. 13/757,399, dated Aug. 15, 2014, 13 pages.

* cited by examiner

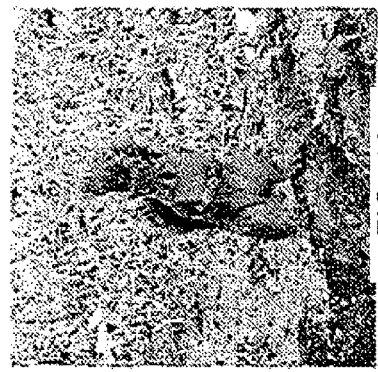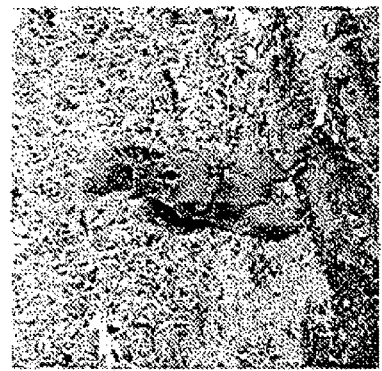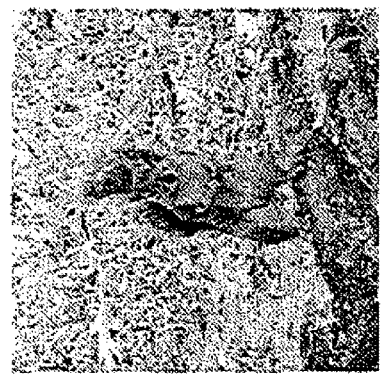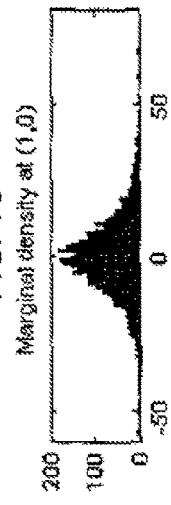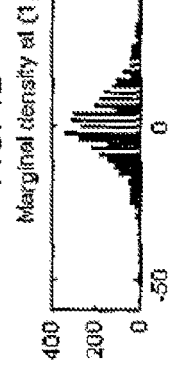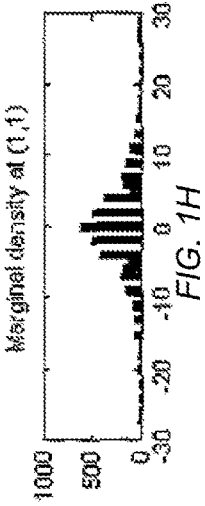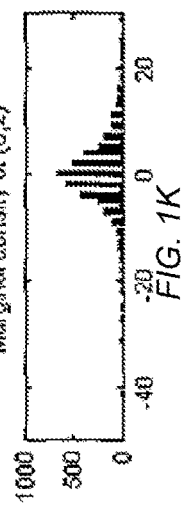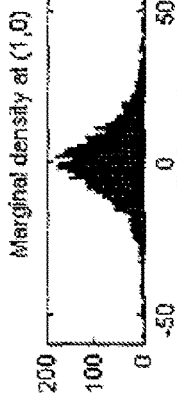

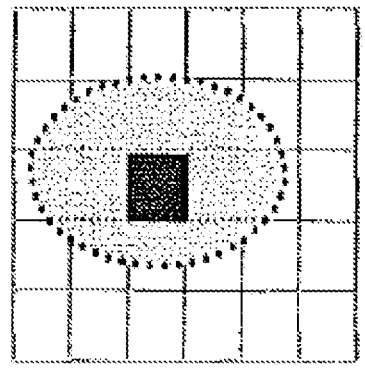
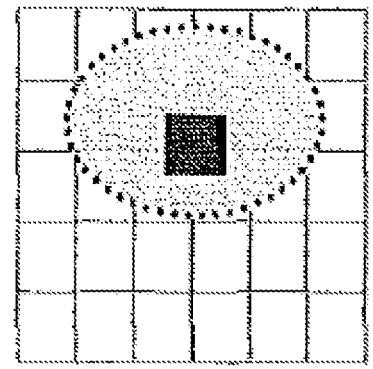
FIG. 2A  FIG. 2B
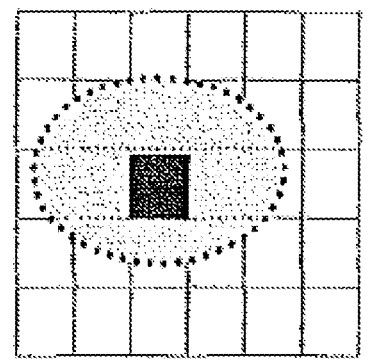
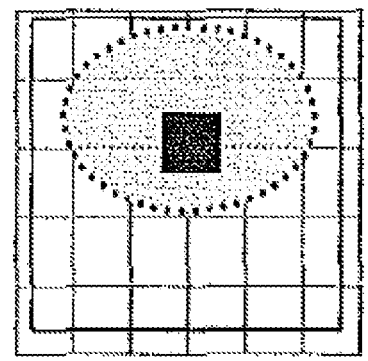
FIG. 3A  FIG. 3B
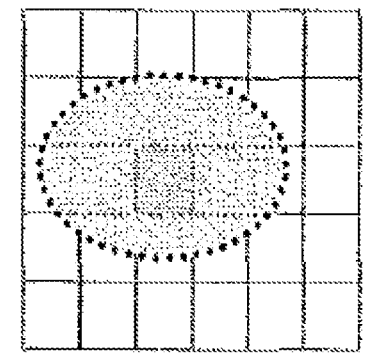
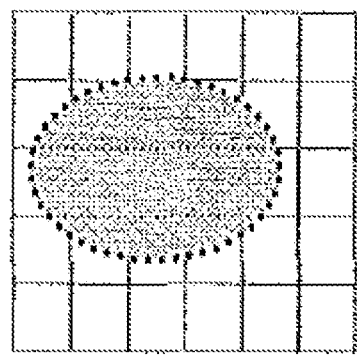
FIG. 4A  FIG. 4B

RICH FEATURE MINING TO COMBAT ANTI-FORENSICS AND DETECT JPEG DOWN-RECOMPRESSION AND INPAINTING FORGERY ON THE SAME QUANTIZATION

PRIORITY CLAIM

This application claims the benefit of U.S. Provisional Application Ser. Nos. 62/010,423 entitled "RICH FEATURE MINING TO DETECT JPEG DOWN-RECOMPRESSION AND INPAINTING FORGERY ON THE SAME QUANTIZATION" filed Jun. 10, 2014 and 62/043,976 entitled "RICH FEATURE MINING TO COMBAT ANTI-FORENSICS AND DETECT JPEG DOWN-RECOMPRESSION AND INPAINTING FORGERY ON THE SAME QUANTIZATION" filed Aug. 29, 2014 and, which are incorporated herein by reference in their entirety.

BACKGROUND

Field

The present disclosure relates generally to methods for detecting tampering in images. More particularly, aspects of the present disclosure relate to systems and methods for detecting down-recompression and inpainting forgery in JPEG images, as well as combating anti-forensics.

Description of the Related Art

In multimedia forensics, the detection of forgery on joint photographic experts group (JPEG) images is meaningful and challenging work. While being widely facilitated and proliferated by digital techniques, digital multimedia can be easily manipulated without leaving any obvious clue. Steganalysis and forgery detection are two interesting areas with broad impact to each other. While multiple promising and well-designed steganalysis methods have been proposed and several steganographic systems have been successfully steganalyzed, the advance in forgery detection may trail behind.

As a standardized lossy compression, JPEG is the most popular digital image format and standard in our daily life. JPEG image-based forensics has become one of hot spots in multimedia forensics. In terms of the manipulation of JPEG image forgery, generally, the tampering involves several basic operations, such as image resize, rotation, splicing, double compression. The detection of these fundamental manipulations and relevant forgery has been well studied. For example, double JPEG compression is one of most adopted manipulations.

In some cases, the bit stream of a JPEG image is decoded and the manipulation is implemented in spatial domain. The modified image is then compressed back to JPEG format. If the newly adopted quantization table is different from the one used by original JPEG image, the modified JPEG image may be said to have undergone a double JPEG compression. Although JPEG based double compression does not by itself prove malicious or unlawful tampering, it is an evidence of image manipulation.

Some detection methods have been proposed for JPEG double compression, one of common operations that may occur in the tampering manipulation. When the quality of the second compression is higher than the quality of the first compression, some existing methods have obtained good detection results. Existing methods may, however, fall short of accurately detecting the down-recompression when the second compression quality is lower than the first compression quality. A crafty forgery maker may take account of the weakness of the current detection arts, doctor images and produced them in a lower image quality, to escape from being detected.

Inpainting, also known as image completion, is the process to reconstruct lost or corrupted parts of images and videos. Though inpainting, originally designed to reconstruct lost or deteriorated parts of images and videos, inpainting has been used for image tampering, including region filling and object removal to disguise the meaning of objects or conceal the truth. While several types of tampering have been successfully exposed, few studies address the challenge of inpainting forgery in JPEG images.

There are many applications of the inpainting technique, ranging from film restoration, deterioration reverse, to image and video editing and restoration, including but not limited to removal of occlusions, such as texts, subtitles, stamps, logos, watermarks, wrinkles, and unwanted objects from digital images and/or videos. Most inpainting methods in the literature can be mainly classified into geometry- and texture-oriented methods. Geometry-oriented methods are performed by using a partial differential equation (POE), derived from variation principles, showing good performance in propagating smooth level lines or gradients, but undesirable in the presence of texture. Geometry-oriented methods are local in the sense since the PDEs only involve the interactions among neighboring pixels on the image grid. Texture-oriented methods model texture as a probabilistic graphical model. These methods may be referred to as exemplar-based approaches. Bugeau et al. has combined copy-paste texture synthesis, geometric PDEs and coherence among neighboring pixels and proposed a comprehensive framework for image inpainting, being able to approximately minimize proposed energy function.

Several inpainting tools are currently available on the Internet. Cyber criminals may easily obtain these inpainting tools to disguise objects and conceal the truth of digital photos, which might be presented as important evidences for legitimate purposes. As such, there is a heightened need to detect such tampering in digital JPEG images. Several methods have been proposed for JPEG-based forensics, such as the detection of image resize, splicing, double compression and duplication detection. However, regarding the detection of inpainting-based forgery in digital image has not been fully explored, especially regarding the tampering detection in JPEG images.

SUMMARY

Systems and methods for detecting down-recompression and inpainting forgery in JPEG images are described. In some embodiments, a method and system includes a rich feature mining-based approach that detects JPEG down-recompression and inpainting forgery on the same quantization. Rich neighboring joint density features may be designed according to different frequency coordinates in the DCT domain and under the shift recompression versions. One or more ensemble classifiers may be employed for the detection.

In an embodiment, a method of detecting tampering in a compressed digital image includes extracting one or more neighboring joint density features from an image under scrutiny and extracting one or more neighboring joint density features from an original image. The image under scrutiny and the original image are decompressed into a spatial domain. Tampering in the image under scrutiny is detected based on at least one difference in a neighboring joint density feature of the image under scrutiny and a neighboring joint density feature of the original image. In some embodiments, detecting tampering in the image under scrutiny includes detecting down-recompression of at least a portion of the image. In some embodiments, detecting tampering in the image includes detecting inpainting forgery in the same quantization.

In an embodiment, a system includes a tampering detection system implemented on one or more computing devices. The tampering detection system includes a digital image feature extraction component, a digital image decoder, and a digital image tampering detector. The digital image feature extraction component is configured to implement extracting one or more neighboring joint density features from a digital image under scrutiny and extracting one or more neighboring joint density features from an original digital image. The digital image decoder is configured to implement decoding the digital image under scrutiny and the original digital image to a spatial domain. The digital image tampering detector is configured to detecting tampering in the digital image under scrutiny based on at least one difference in a neighboring joint density feature of the digital image under scrutiny and a neighboring joint density feature of the original digital image.

In an embodiment, a non-transitory, computer-readable storage medium includes program instructions stored thereon. The program instructions, when executed on one or more computers, cause the one or more computers to implement a digital image tampering detection system configured to: extract one or more neighboring joint density features from a digital image under scrutiny; extract one or more neighboring joint density features from an original digital image; decode the digital image under scrutiny and the original digital image to a spatial domain; and detect tampering in the digital image under scrutiny based on at least one difference in a neighboring joint density feature of the digital image under scrutiny and a neighboring joint density feature of the original digital image.

In an embodiment, a method of detecting tampering in a compressed digital image includes determining one or more values associated with neighboring joint density for an image under scrutiny and determining one or more values associated with neighboring joint density for an second image related to the image under scrutiny. Tampering in the image under scrutiny is detected based differences between values associated with neighboring joint density of the image under scrutiny and values associated with neighboring joint density feature of the associated image. In some embodiments, detecting tampering in the image under scrutiny includes detecting down-recompression of at least a portion of the image. In some embodiments, detecting tampering in the image includes detecting inpainting forgery in the same quantization.

In an embodiment, a system includes a tampering detection system implemented on one or more computing devices. The tampering detection system includes a tampering detection system implemented on one or more computing devices. The digital image tampering detector is configured to implement determining one or more values associated with neighboring joint density for an digital image under scrutiny; determining one or more values associated with neighboring joint density for an second digital image related to the digital image under scrutiny; and detecting tampering in the digital image under scrutiny based on at least one difference between values associated with neighboring joint density of the digital image under scrutiny and values associated with neighboring joint density feature of the digital image associated with the digital image under scrutiny.

In an embodiment, a non-transitory, computer-readable storage medium includes program instructions stored thereon. The program instructions, when executed on one or more computers, cause the one or more computers to implement a digital image tampering detection system configured to: determine one or more values associated with neighboring joint density for an digital image under scrutiny; determine one or more values associated with neighboring joint density for an second digital image related to the digital image under scrutiny; and detect tampering in the digital image under scrutiny based on at least one difference between values associated with neighboring joint density of the digital image under scrutiny and values associated with neighboring joint density feature of the digital image associated with the digital image under scrutiny.

Methods as described herein may be effective not only in detecting JPEG down-recompression and inpainting forgery in the same quantization, but also effective to combat anti-forensics.

BRIEF DESCRIPTION OF THE DRAWINGS

FIG. 1A depicts a singly compressed JPEG image with quality factor '75'.

FIG. 1B depicts a doubly compressed JPEG image with quality factor '55'.

FIG. 1C depicts doubly compressed JPEG image with quality factor '90'.

FIG. 1D depicts the marginal densities of the JPEG image of FIG. 1A at the second row for the frequency coordinate (1,0).

FIG. 1E depicts the marginal densities of the JPEG image of FIG. 1B at the second row for the frequency coordinate (1,0).

FIG. 1F depicts the marginal densities of the JPEG image of FIG. 1C at the second row for the frequency coordinate (1,0).

FIG. 1G depicts the marginal densities of the JPEG image of FIG. 1A at the third row for the frequency coordinate (1,1).

FIG. 1H depicts the marginal densities of the JPEG image of FIG. 1B at the third row for the frequency coordinate (1,1).

FIG. 1I depicts the marginal densities of the JPEG image of FIG. 1C at the third row for the frequency coordinate (1,1).

FIG. 1J depicts the marginal densities of the JPEG image of FIG. 1A at the fourth row at the frequency coordinate (0,2).

FIG. 1K depicts the marginal densities of the JPEG image of FIG. 1B at the fourth row at the frequency coordinate (0,2).

FIG. 1L depicts the marginal densities of the JPEG image of FIG. 1C at the fourth row at the frequency coordinate (0,2).

FIG. 2A illustrates a compositing forgery involving JPEG down-recompression where the source image quality is $QF_{S1}$.

FIG. 2B illustrates that a region from S1 is composited to $S_2$ (image quality $QF_{S2}$).

FIG. 3A illustrates a compositing forgery involving JPEG down-recompression where the source image quality is $QFS_1$.

FIG. 3B shows a region extracted from $S_1$ is composited to $S_2$ (image quality $QF_1$), then the doctored image is cropped according to the solid rectangle and then saved at a lower image quality $QF_2$ ($QF_2<QF_1$).

FIG. 4A is an illustration of inpainting in a JPEG format where the source image quality is $QF_1$.

FIG. 4B shows how a region from in S is doctored by inpainting and modified image S is saved at image quality $QF_2$.

Figure 5:
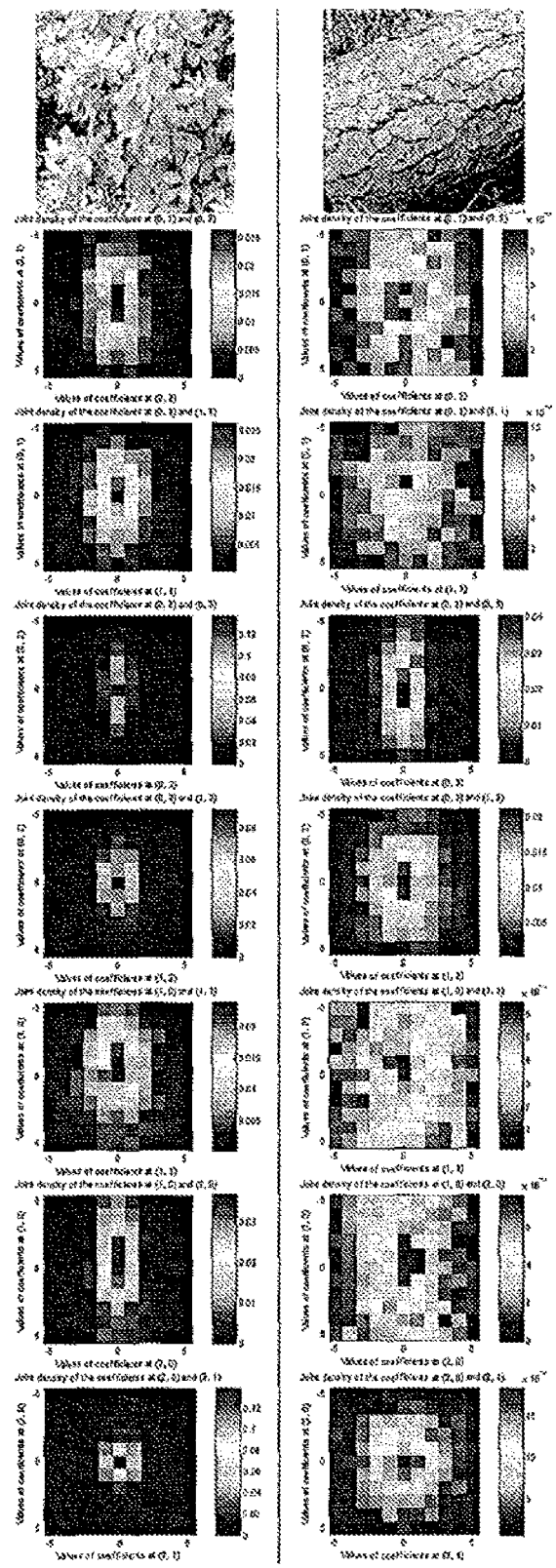
FIG. 5 illustrates neighboring joint densities of two JPEG images at different frequency coordinates in the DCT domain.
Figure 6A:
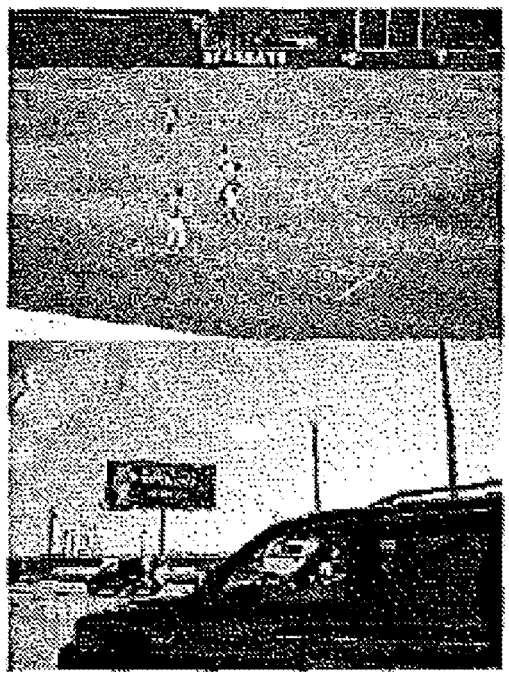
FIG. 6A shows an untouched JPEG image.
Figure 6B:
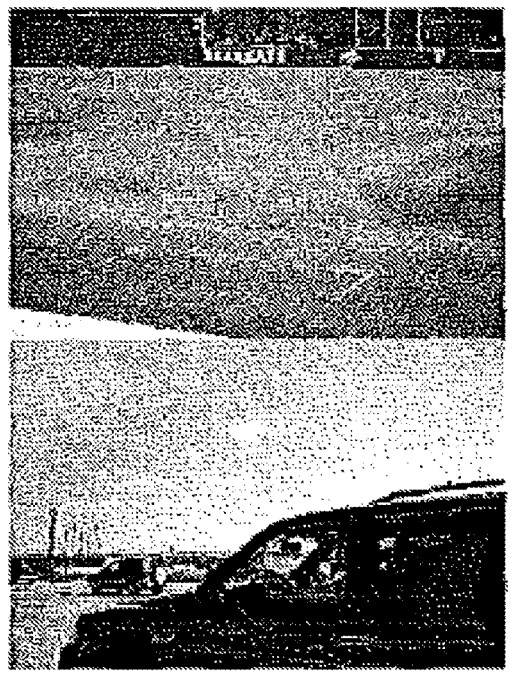
FIG. 6B shows a doctored JPEG image of FIG. 6A.
Figure 6C:
FIG. 6C shows an untouched JPEG image.
Figure 6D:
FIG. 6D shows a doctored JPEG image of FIG. 6A.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Methods and systems as described herein may address the problems of detecting JPEG down-recompression and detecting inpainting based forgery in JPEG images on the same quantization.

In various embodiments, a method extracts rich neighboring joint density features with an ensemble classifier for the detection. Detection may use or adapt neighboring joint density-based steganalysis methods including, but not limited to Liu, Q., Sung, A H. and Qiao, M. 2009. Improved detection and evaluations for JPEG steganalysis, in *Proc. The 17th ACM Multimedia*, pp. 873-876; Liu, Q. 2011. Steganalysis of DCT-embedding based adaptive steganography and YASS, In *Proc. The Thirteenth ACM workshop on Multimedia and Security*, pp. 77-86; or Liu, Q., and Chen, Z. 2014 Improved approaches with calibrated neighboring joint density to steganalysis and seam-carved forgery detection in JPEG images, *ACM Transaction on Intelligent Systems and Technology* (each of which is incorporated by reference as if fully set forth herein), and/or a shift-recompression-based approach to detecting cropping and relevant forgery on the same quantization Liu, Q. 2011, Detection of misaligned cropping and recompression with the same quantization matrix and relevant forgery. In *Proc. 3rd International workshop on Multimedia in Forensics and Intelligence*, pages 25-30 (which is incorporated by reference as if fully set forth herein).

In some embodiments, a method and system includes a rich feature mining-based approach that detects JPEG down-recompression and inpainting forgery on the same quantization. Rich neighboring joint density features may be designed according to different frequency coordinates in the DCT domain and under the shift recompression versions. One or more ensemble classifiers may be employed for the detection. In some embodiments, the method detects JPEG down-recompression and/or exposes the inpainting forgery on the same quantization.

In some embodiments, using correlation of neighboring discrete cosine transform (DCT) coefficients in JPEG images, a group of neighboring joint density features across different frequency coordinates under different shift recompressions. Ensemble learning is used for the detection.

In JPEG compression, the marginal density of DCT coefficients at each frequency may approximately follow the generalized Gaussian distribution (GGD). The GGD model may be described as:

$$\rho(x; \alpha, \beta) = \frac{\beta}{2\alpha\Gamma(1/\beta)} \exp\{-(|x|/\alpha)^\beta\} \quad (1)$$

Where $\Gamma(\cdot)$ is the Gamma function, scale parameter $\alpha$ models the width of the PDF peak, and shape parameter $\beta$ models the shape of the distribution.

JPEG double compression may change the marginal density, and the modification depends on the first compression quality and the second compression quality, as shown by FIG. 1. FIG. 1 shows marginal densities of a single compression (left) and double compressions (middle and right). X-axis and y-axis give the values of the DCT coefficients and the occurrences. FIG. 1 demonstrates a singly compressed JPEG image with quality factor '75' (a), doubly compressed JPEG images of the first compression quality factor '55' (b) and '90' (c) respectively, followed by the second compression quality factor '75' at the first row. The marginal densities are plotted at the second row for the frequency coordinate (1,0), the third row for the frequency coordinate (1,1), and the fourth row at the frequency coordinate (0,2). The modification by the double compression from a lower first quality factor '55', shown in FIGS. 1(e), (h), and (k), demonstrates by the periodical gaps. However, the modification caused by the double compression from a higher first quality factor '90', as shown by FIGS. 1(f), (i), and (l), is not clear.

The detection while the first compression quality may be satisfactory, corresponding to large quantization steps, is lower than the second compression quality, corresponding to small quantization steps. It may however still be hard to satisfactorily detect JPEG down recompression.

By merging marginal density and neighboring joint density in DCT domain, a feature mining-based method may be used to detect JPEG double compression. The detection results using a detection method of Liu et al. and a Markov-process-based approach, are shown in Table 1 (taken from Liu, Q., Cooper, P. A., Chen, L., Cho, H., Chen, Z., Qiao, M., Su, Y., Wei, M. and Sung, A. H. 2013. Detection of JPEG double compression and identification of smartphone image source and post-capture manipulation. *Applied Intelligence* 39(4): 705-726, which is incorporated by reference as if fully set forth herein). The detection accuracy on JPEG down recompression is highlighted by the dashed triangle.

TABLE 1

Average accuracy over 100 testing in detecting aligned JPEG double compression by using Markov approach (first row), marginal & neighboring joint density feature set (second row)

| QF2 | QF1: 40 | 45 | 50 | 55 | 60 | 65 | 70 | 75 | 80 | 85 | 90 |
|---|---|---|---|---|---|---|---|---|---|---|---|
| 40 |  | 94.6 | 97.6 | 98.1 | 98.0 | 96.8 | 93.5 | 96.4 | 59.8 | 82.4 | 63.9 |
|  |  | 96.4 | 97.8 | 98.5 | 98.5 | 96.9 | 97.8 | 97.2 | 91.3 | 95.4 | 82.5 |
| 45 | 96.1 |  | 86.6 | 96.6 | 97.3 | 97.9 | 96.8 | 94.2 | 90.6 | 88.9 | 72.9 |
|  | 96.9 |  | 92.8 | 97.3 | 98.3 | 98.5 | 97.2 | 98.2 | 96.0 | 94.5 | 89.9 |
| 50 | 98.6 | 91.0 |  | 85.5 | 97.2 | 98.3 | 97.9 | 93.0 | 96.1 | 82.4 | 53.9 |
|  | 98.6 | 95.3 |  | 92.4 | 97.6 | 98.6 | 98.3 | 93.3 | 97.2 | 95.4 | 85.0 |
| 55 | 99.1 | 98.3 | 90.2 |  | 91.2 | 97.6 | 98.4 | 97.6 | 95.2 | 66.3 | 83.8 |
|  | 99.1 | 98.4 | 94.7 |  | 99.8 | 98.4 | 98.7 | 98.1 | 97.1 | 94.5 | 94.7 |
| 60 | 99.2 | 99.1 | 98.6 | 94.8 |  | 94.7 | 97.7 | 98.3 | 98.3 | 94.0 | 81.3 |
|  | 99.4 | 99.1 | 98.3 | 96.9 |  | 97.6 | 98.6 | 98.9 | 97.0 | 97.4 | 93.0 |
| 65 | 99.3 | 99.4 | 99.2 | 98.9 | 97.1 |  | 94.7 | 97.9 | 98.2 | 95.5 | 88.6 |
|  | 99.6 | 99.6 | 99.3 | 99.1 | 98.1 |  | 97.4 | 98.6 | 98.5 | 98.5 | 94.4 |
| 70 | 99.4 | 99.4 | 99.4 | 99.3 | 99.3 | 97.2 |  | 96.3 | 98.5 | 95.1 | 72.5 |
|  | 99.7 | 99.7 | 99.7 | 99.5 | 99.2 | 98.1 |  | 97.6 | 99.0 | 97.2 | 92.5 |
| 75 | 99.3 | 99.4 | 99.4 | 99.4 | 99.3 | 99.3 | 98.2 |  | 97.1 | 98.6 | 94.3 |
|  | 99.8 | 99.8 | 99.8 | 99.8 | 99.7 | 99.3 | 98.3 |  | 98.9 | 99.1 | 96.8 |
| 80 | 99.6 | 99.6 | 99.6 | 99.3 | 99.3 | 99.5 | 99.5 | 99.0 |  | 97.6 | 94.7 |
|  | 99.8 | 99.9 | 99.8 | 99.9 | 99.8 | 99.8 | 99.7 | 99.6 |  | 99.0 | 97.2 |
| 85 | 99.6 | 99.6 | 99.6 | 99.6 | 99.7 | 99.6 | 99.6 | 99.5 | 99.4 |  | 98.5 |
|  | 100.0 | 100.0 | 100.0 | 99.9 | 99.9 | 100.0 | 99.9 | 99.9 | 99.5 |  | 99.4 |
| 90 | 99.8 | 99.8 | 99.8 | 99.8 | 99.8 | 99.8 | 99.7 | 99.8 | 99.9 | 99.6 |  |
|  | 100.0 | 100.0 | 100.0 | 100 | 100.0 | 100.0 | 100.0 | 100.0 | 100.0 | 99.9 |  |

As shown by Table 1, detection results have been obtained by integrating marginal density and neighboring joint density. This study included aligned JPEG recompression but did not address misaligned recompression. The detection accuracy to detect the down-recompression is only 82.5%, while the first compression quality is 90 and the second compression quality is 40.

Down-Recompression-Based Tampering

Although JPEG double compression including down-recompression does not by itself prove malicious or unlawful tampering, if it is revealed that different regions of an image have undergone different manipulations, then it may be deduced that the image has been tampered with. FIG. 2 illustrates a compositing forgery involving JPEG down-recompression. The blocks from $S_1$ are composited to $S_2$. In FIG. 2(a), the source image quality is $QF_{S1}$. In FIG. 2(b) a region from S1 is composited to $S_2$ (image quality $QF_{S2}$). The doctored image is saved at a lower image quality $QF_2$ ($QF_2<QF_{S1}$; $QF_2<QF_{S2}$). The dashed squares denote 8×8 blocks.

Some problems that may occur in the down-recompression-based compositing are listed in items (a) through (d) below:

(a) $QF_{S1} \neq QF_{S2}$, and original source image $S_1$ is a never compressed image. The detection of such a forgery is converted to distinguish between single compression and DCT block aligned JPEG down-recompression;

(b) $QF_{S1} \neq QF_{S2}$, and original source image $S_2$ is a never compressed image. The detection of such a forgery is converted to distinguish between single compression and DCT block misaligned JPEG down-recompression;

(c) $QF_{S1} \neq QF_{S2}$, and original source image $S_1$ and $S_2$ are both JPEG images. The detection of such a forgery is actually detect JPEG aligned and misaligned down-recompressions with different first compression qualities;

(d) $QF_{S1} = QF_{S2} = QF_1$. A crafty forgery maker may meticulously select the image sources of the same quality and manipulate the image objects, and save the doctored image at a lower image quality $QF_2$ ($QF_2<QF_1$). The detection is converted to distinguish JPEG misaligned down-compression and aligned down-compression with the same first compression quality.

(e) Given the above problem (d), even the forgery maker composites the images from the same image quality, and crops the doctored image in the spatial domain, and then saves the tampered image at a lower image quality, illustrated by FIG. 3. The detection is converted to distinguish two misaligned down-compressions with the same first compression quality.

In FIG. 3(a), the source image quality of $S_1$ is $QF_1$. In FIG. 3(b), a region extracted from $S_1$ is composited to $S_2$ (image quality $QF_1$), then the doctored image is cropped according to the solid rectangle and then saved at a lower image quality $QF_2$ ($QF_2<QF_1$). The dashed squares denote 8×8 blocks.

Inpainting on the Same Quantization

The types of forgery manipulations in JPEG images include region duplication, splicing, compositing, and seam-carving. Some detection methods are only effective when an inpainting image is saved in an uncompressed format or in JPEG compressed format of higher quality than the original JPEG image quality. In other words, it may be still ineffective to detect the inpainting forgery while the doctored image is saved at the same image quality or a lower image quality.

FIG. 4 is an illustration of inpainting in a JPEG format. In FIG. 4(a), the source image quality is $QF_1$. In FIG. 4(b), a region from in S is doctored by inpainting and modified image S is saved at image quality $QF_2$. While doctored image after inpainting saved at uncompressed format, the untouched part of original image, the outside of ellipse, illustrated by FIG. 4, is undergone JPEG compression and uncompressing, which is different from the processing to the touched part, represented by eclipse. While the doctored image is saved in JPEG at a higher quality or QF2>QF1, the untouched part is processed in up-recompression, and touched part could be approximately modeled as a single JPEG compression, such a detection has been converted to distinguish double compression (actually up-recompression)

and an approximate single compression. The detection of up-recompression is demonstrated by Table 1.

While QF2<QF1, the forgery detection is to distinguish between down-recompression (untouched area) and an approximate single compression (inpainting area).

The neighboring joint density of the DCT coefficients may approximately follow the Multivariate Generalized Gaussian Distribution (MGGD). It is not clear the exact modeling on the joint density of the quantized DCT coefficients in JPEG images. However, neighboring joint density may be modified by several types of manipulation to JPEG images including JPEG double compression, seam-carving-based tampering, and data embedding in steganography.

In some cases, a neighboring joint density-based approach may be used to detect JPEG-based steganography. Calibrated neighboring joint density may also be used to improve the detection of steganography in JPEG images. In some cases, calibrated neighboring joint density under different shift-recompressions is used to detect the content-aware-based tampering in JPEG images on the same quantization.

By using a 144-D feature set, the approach of calibrated neighboring joint density may deliver the detection results. The feature extraction of calibrated neighboring joint density is proceeded in DCT domain and accumulated across different frequency coordinates and the calibration is averaged over different shift recompressions. With a low dimensional feature set, this approach may be superior to rich model-based steganalysis detection methods that contain over ten thousands of features while detecting several types of steganographic systems. By integrating marginal density, neighboring joint density may be used in the detection of JPEG double compression and improved the detection of down-recompression, as shown by Table 1.

The neighboring joint density-based method may ignore the contribution on individual frequency coordinate. The discrimination by some individual frequency coordinate may, however, be important to JPEG-based forensics.

FIG. 5 illustrates neighboring joint densities of two JPEG images at different frequency coordinates in the DCT domain. In FIG. 5, the two JPEG images are at the image quality of "75", and the neighboring joint densities of the quantized DCT coefficients at different frequency coordinates. The neighboring joint density is generally different at different frequency coordinates and different at the same frequency coordinates across different images. The density distribution is approximately symmetric to the lines x=0 and y=0.

Characteristics of Down-Recompression

While JPEG compression is performed to a never compressed image, the DCT coefficients before quantization and after quantization are denoted $pc_{mn}$ and $c_{mn}$ respectively at the frequency coordinate (m, n) (m=0, 1 . . . 7; n=0, 1 . . . 7), the quantization step is denoted $Q_{mn}^{(2)}$, and R(•) denotes the round function.

$$c_{mn} = R\left(\frac{pc_{mn}}{Q_{mn}^{(2)}}\right) \quad (2)$$

We have:

$(c_{mn}-0.5)Q_{mn}^{(2)} \leq pc_{mn} < (c_{mn}+0.5)Q_{mn}^{(2)}$

As for down-recompression, the quantization steps at the first and the second compression are denoted by $Q_{mn}^{(1)}$ and $Q_{mn}^{(2)}$ ($Q_{mn}^{(1)} < Q_{mn}^{(2)}$). Without losing a generality, suppose $c_{mn}$ is positive, the quantized DCT coefficient after down-recompression is denoted by $c_{mn}^{(2)}$ ignoring the truncate error, $$c_{mn}^{(2)} = R\left(R\left(\frac{pc_{mn}}{Q_{mn}^{(1)}}\right) \cdot \frac{Q_{mn}^{(1)}}{Q_{mn}^{(2)}}\right) \quad (3)$$

Let $$c_{mn}^{(1)} = R\left(\frac{pc_{mn}}{Q_{mn}^{(1)}}\right) \quad (4)$$

Then, $$c_{mn}^{(2)} = R\left(\frac{c_{mn}^{(1)} Q_{mn}^{(1)}}{Q_{mn}^{(2)}}\right) \quad (5)$$

$$c_{mn}^{(2)} = \begin{cases} c_{mn}-1, & c_{mn}^{(1)} Q_{mn}^{(1)} < (c_{mn}-0.5)Q_{mn}^{(2)} \leq \\ & pc_{mn} < (c_{mn}^{(1)}+0.5)Q_{mn}^{(1)} \\ c_{mn}, & (c_{mn}-0.5)Q_{mn}^{(2)} \leq c_{mn}^{(1)} Q_{mn}^{(1)} < \\ & (c_{mn}+0.5)Q_{mn}^{(2)} \\ c_{mn}+1, & (c_{mn}^{(1)}-0.5)Q_{mn}^{(1)} \leq pc_{mn} < \\ & (c_{mn}+0.5)Q_{mn}^{(2)} \leq c_{mn}^{(1)} Q_{mn}^{(1)} \end{cases} \quad (6)$$

As indicated by equation (6), compared to the single compression, the JPEG down-recompression may change the value of the DCT coefficient by 1, although the modification ratio is small. As a result, the marginal density of the DCT coefficients will be modified, so will the neighboring joint density. The neighboring joint density-based approaches may be successful in detecting several types of steganographic systems and exposing seam-carved forgery in JPEG images. Nevertheless, problems as discussed previously may be present. The following rich neighboring joint density features to detect JPEG down-recompression and inpainting on the same quantization.

Rich Neighboring Joint Density

Neighboring Joint Density on Intra-Block

In one embodiment, a Quantized DCT coefficient array includes $B_1 \times B_2$ blocks. The $F_{ij}$ (i=1, 2, . . . , $B_1$; j=1, 2, . . . , $B_2$)-th block includes 8×8 quantized DCT coefficients. The coefficient at the frequency coordinate (m, n) of the block $F_{ij}$ (m=0, 1, . . . 7, and n=0, 1, . . . 7) is denoted by $C_{ijmn}$. The individual frequency-based neighboring joint density on horizontal direction and vertical direction are given by:

$$absNJ_{1h}(m, n; x, y) = \frac{\sum_{i=1}^{B_1} \sum_{j=1}^{B_2} \delta(|c_{ijmn}| = x, |c_{ijm(n+1)}| = y)}{B_1 B_2} \quad (7)$$

$$absNJ_{1v}(m, n; x, y) = \frac{\sum_{i=1}^{B_1} \sum_{j=1}^{B_2} \delta(|c_{ijmn}| = x, |c_{ij(m+1)n}| = y)}{B_1 B_2} \quad (8)$$

Where δ=1 if its arguments are satisfied, otherwise δ=0; x and y are integers. In this example, the frequency coordinate pair (m, n) is set to (0,1), (1,0), (2,0), (1,1), (0,2), (0,3), (1,2), (2,1), (3,0), (4,0), (3,1), (2,2), (1,3), and (0,4). The integer values x and y are set from 0 to 4. There are a total of 700 features.

Neighboring Joint Density on Inter-Block

Similarly, the inter-block neighboring joint density may be constructed on individual frequency band along the horizontal direction and vertical direction. The features may be constructed as follows:

$$absNJ_{2h}(m, n; x, y) = \frac{\sum_{i=1}^{B_1}\sum_{j=1}^{B_2}\delta(|c_{ijmn}| = x, |c_{i(j+1)mn}| = y)}{B_1(B_2 - 1)} \quad (9)$$

$$absNJ_{2v}(m, n; x, y) = \frac{\sum_{i=1}^{B_1}\sum_{j=1}^{B_2}\delta(|c_{ijmn}| = x, |c_{(i+1)jmn}| = y)}{(B_1 - 1)B_2} \quad (10)$$

The pairs of (m,n) and (x,y) are the same to equations (7) and (8), thus in this example another 700 features are obtained.

Calibrated Neighboring Joint Density

The JPEG image under examination may be decoded to spatial domain, which may be denoted by matrix $S(i, j)$ ($i=1, 2, \ldots$; $j=1, 2 \ldots, N$). For $d_1=0$ to 7, and $d_2=0$ to 7, while $(d_1, d_2)$ (0,0), take the following process i) to iii):
  i. Shift the matrix $S(i, j)$ by $d_1$ rows and $d_2$ columns in the spatial domain, $(d_1, d_2) \in \{(0, 1), \ldots, (0, 7), (1,0), \ldots, (7,7)\}$ and generate a shifted spatial image $S'(d_1, d_2)$, $S'(d_1, d_2)=S(i-d_1, j-d_2)(i=d_1+1, d_1+2, \ldots, M; j=d_2+1, q+d_2, \ldots, N)$;
  ii. Compress the shifted spatial image $S'(d_1, d_2)$ to the JPEG format at the same quality factor;
  iii. Extract neighboring joint density features calculated by equations (7), (8), (9), and (10) respectively.

The offset pair $(d_1, d_2)$ is set from $(0,1), \ldots (0,7), (1,0), \ldots (1,7), \ldots (7,7)$, corresponding to 63 shift-recompressions, and thus, a total of 63×(700+700)=88200 features produced for calibration. By combining all features together, a total of 64×1400=89600 features are generated.

In some embodiments, ensemble methods use multiple models to obtain better predictive performance than could be obtained from any of the constituent models. To cope with high dimensional predictors in our detection, an ensemble classifier may be included that makes use of base learners of Fisher Linear Discriminant. In multimedia forensics, Kodvsky et al. have disclosed ensemble classifiers that may be suited for steganalysis, especially in the case that the number of training examples and the feature dimensionality are high.

Experiments

Detection of JPEG Down-Recompression with/without Anti-Forensics

Detecting Single Compression and Down-Recompression 10,000 never compressed raw format photos were obtained by using four digital cameras Nikon D3100, SamSung GX 10, Cannon Rebel EOS T2i, and Olympus PEN E-PL1 (2,500 each from each digital camera). To address the problems (a) and (b), described in section 2.2, 2,500 singly compressed JPEG image were produced at the quality factor of '40' (QF=40), 12,500 aligned and 12,500 misaligned JPEG down-compressed image at the second quality factor $QF_2$ of '40' and the first compression qualities $QF_1$, are 90, 80, 70, 60, and 50 respectively (2,500 for misaligned and 2,500 for aligned at each first compression quality).

Additionally, 12,500 single compressed images were produced at the quality $QF_1=90, 80, 70, 60,$ and 50 (2,500 at each quality) respectively, and the following two anti-forensics techniques were applied: 1) "simplified anti-forensics of JPEG compression" that was designed by Qian and Qiao in the Journal of Computers, vol 8, no. 10, October 2013, pp. 2483-2488, and 2) "A variational approach to JPEG anti-forensics" authored by Fan et al. that was published by 2013 IEEE International Conference on Acoustics, Speech and Signal Processing (ICASSP), pages 3058-3062, to these the images, then these processed images compressed to the JPEG format at the quality of 40.

In the experiments, the ensemble classifier proposed in Kodvsky, J., Fridrich, J. and Holub, V. 2012. Ensemble classifiers for steganalysis of digital media. *IEEE Trans. Inf. Forensics Security*, 7(2):432-444 (which is incorporated by reference as if fully set forth herein), was applied to the rich neighboring joint density features extracted from these images. 30 experiments were run to distinguish between single compression and each type of down-recompression. In each experiment, 50% samples from single compression and 50% from the down-recompression were randomly selected for training and the remainders were used for testing. Table 3a and Table 3b show the mean detection accuracy.

TABLE 3a

Mean detection accuracy (%) in detecting down-recompression ($QF_2 = 40$) and the single compression (QF = 40)

| | Detection accuracy | |
| --- | --- | --- |
| $QF_1$ | aligned | misaligned |
| 50 | 99.4 | 99.3 |
| 60 | 99.7 | 98.4 |
| 70 | 99.9 | 95.6 |
| 80 | 98.8 | 90.9 |
| 90 | 97.4 | 75.7 |

TABLE 3b

Mean detection accuracy (%) in detecting the images processed by anti-forensics and then compressed at quality 40 and the single compression (QF = 40)

| | Detection accuracy | |
| --- | --- | --- |
| $QF_1$ | Anti-forensics by Qian and Qiao | Anti-forensics by Fan et al. |
| 50 | 93.5 | 99.4 |
| 60 | 92.1 | 98.8 |
| 70 | 87.2 | 98.2 |
| 80 | 83.2 | 97.3 |
| 90 | 81.0 | 80.3 |

Detecting First Compression Quality from the Down-Recompression

To address problem (c) described above, the same experimental process was conducted as described in the preceding section, but 2,500 singly compressed images were excluded. Three types of experiments were designed: a) detection of the first compression quality from aligned down-recompression; b) detection of the first compression from aligned down-recompression and misaligned down-recompression. The misaligned down-recompression was originally compressed at a higher first compression quality factor, compared to the first compression quality of the aligned down-recompression; and c) detection of aligned down-recompression and misaligned down-recompression. The misaligned down-recompression was once compressed at a lower image compression quality.

Table 4 lists the mean detection accuracy in recognizing the first compression image quality based on the down-recompressed images, by applying ensemble classifier to the rich neighboring joint density features.

TABLE 4

Mean detection accuracy (%) in detecting the first
compression quality ($QF_1$) ($QF_2$ = 40)

| $QF_1$ | 60 | 70 | 80 | 90 |
|---|---|---|---|---|
| (a) Detection of aligned down-recompression ||||| 
| 50 | 99.6 | 99.9 | 99.4 | 99.6 |
| 60 |  | 99.9 | 99.7 | 99.9 |
| 70 |  |  | 99.9 | 100.0 |
| 80 |  |  |  | 99.2 |
| (b) Detection of misaligned down-recompression (lower first image quality) and aligned down-recompression ||||| 
| 50 | 99.7 | 99.9 | 99.2 | 99.4 |
| 60 |  | 99.8 | 99.1 | 99.3 |
| 70 |  |  | 99.2 | 98.2 |
| 80 |  |  |  | 97.4 |
| (c) Detection of misaligned down-recompression (higher first image quality) and aligned down-recompression ||||| 
| 50 | 99.2 | 99.4 | 99.4 | 99.5 |
| 60 |  | 99.6 | 99.6 | 99.7 |
| 70 |  |  | 99.9 | 100.0 |
| 80 |  |  |  | 98.8 |

Detecting Aligned and Misaligned Down-Recompression Under the Same First Compression To study the problem (d) described above, we produced 12,500 aligned down-recompression images and 12,500 misaligned down-recompression images. The experimental setup and processing are the same as described above. Table 5 lists the mean detection accuracy.

TABLE 5

Mean detection accuracy (%) in detecting aligned and
misaligned down-recompression ($QF_2$ = 40) under
the same first image compression quality ($QF_1$)

| $QF_1$ | Detection accuracy |
|---|---|
| 50 | 99.6 |
| 60 | 99.7 |
| 70 | 99.9 |
| 80 | 99.0 |
| 90 | 97.1 |

Discriminating Misaligned Down-Recompression Under the Same First Compression

In problem (e) described above, there are 63×62=3906 combinations of misalignment pairs, and the computational cost to complete all combinations was high. To test rich neighboring joint density features for the discrimination of the misalignment, the misalignment pairs (1, 0), (2, 0), (7, 6), and (7, 7) were randomly selected, and produced 12,500 misaligned down recompression images ($QF_1$=50, 60, 70, 80, and 90; $QF_2$=40) for each of these four misalignments, in a total of 50,000 images. Table 6 shows the mean testing accuracy in distinguishing these different misalignments.

TABLE 6

Mean detection accuracy (%) in detecting the
misalignment of the down-recompression ($QF_2$ = 40) under the
same first image quality ($QF_1$)

| Misalignment | | $QF_1$ ||||
|---|---|---|---|---|---|
|  |  | 50 | 60 | 70 | 80 | 90 |
| (1,0) | (2,0) | 99.4 | 99.3 | 98.9 | 94.3 | 74.0 |
|  | (7,6) | 99.4 | 99.5 | 98.8 | 92.1 | 72.6 |
|  | (7,7) | 99.5 | 99.5 | 99.3 | 91.3 | 65.5 |

TABLE 6-continued

Mean detection accuracy (%) in detecting the
misalignment of the down-recompression ($QF_2$ = 40) under the
same first image quality ($QF_1$)

| Misalignment | | $QF_1$ |||||
|---|---|---|---|---|---|---|
|  |  | 50 | 60 | 70 | 80 | 90 |
| (2,0) | (7,6) | 99.4 | 99.5 | 98.9 | 94.4 | 77.9 |
|  | (7,7) | 99.6 | 99.4 | 99.1 | 94.8 | 75.0 |
| (7,6) | (7,7) | 98.4 | 98.0 | 95.9 | 92.9 | 77.8 |

Detection of Inpainting on the Same Quantization

Experimental Setup

Over 1000 digital photos in raw format from the four digital cameras described above are stored in JPEG format at the quality factor of '75'. After comparing several open source tools on image inpainting, the Teorex inpainting tool at http://www.theinpaint.com/ was selected for tampering, since it delivers the best inpainting outcomes without any perceivable disguise. Doctored images were stored in JPEG format at the same quality factor of '75'. FIG. 6 shows some untouched JPEG images (on the left) and doctored JPEG images (on the right).

After tampering production, 6,379 inpainted JPEG images were extracted at the same compression quality in the size of 256×256 from the doctored JPEG images. The extraction of the inpainting proceeded in this way: the doctored JPEG image and original untouched JPEG image were uncompressed image into spatial domain, and each region of 256×256 compared if the percentage of the number of the pixels that are different between untouched and touched is not smaller than 35%. 9, 707 untouched JPEG images at the same quality were also extracted in the size of 256×256 from the original untouched large JPEG image. All extractions match original JPEG compression blocks, that is, 256×256 inpainted and untouched JPEG images are aligned with original DCT blocks; the extraction did not destroy the existing DCT blocks.

The inpainting detection performance was compared by using rich neighboring joint density features, abbreviated as R-absNJ, and by using related feature sets that were originally designed for steganalysis, Table 7 lists these feature sets carried out in our experiments.

TABLE 7

The feature sets tested in our experiments

| Feature Set | Feature Dimension | Source |
|---|---|---|
| absNJ | 72 | [17, 19] |
| CC-absNJ | 144 | [20, 24] |
| R-absNJ | 89,600 | Proposed |

Results

The ensemble classifier designed by Kodovdsky et al. and Fisher linear discriminant (FLD) were used in the detection.

Table 8 lists the mean testing accuracy over 30 experiments in the supervising learning on 6,379 inpainted 256×256 JPEG images and 9,707 untouched 256×256 JPEG images. In each experiment, 50% observations were randomly selected for training and other 50% observations are used for testing. The prediction outcome of testing sets may be classified as True Positive (TP), False Positive (FP), False Negative (FN), and True Negative (TN). Without losing generality, we calculate the testing accuracy by 0.5*TP/(TP+FN)+0.5*TN/(TN+FP). Compared to previous detectors absNJ and CC-absNJ, the proposed feature set, R-absNJ, (such as further described herein) obtains 93.4% testing accuracy with FLD and 97.2% testing accuracy with ensemble learning.

TABLE 8

Mean detection accuracy (%)

| Feature set | FLD | Ensemble |
|---|---|---|
| absNJ | 68.1 | NA |
| CC-absNJ | 70.3 | NA |
| R-absNJ | 93.4 | 97.2 |

Comparing FLD to the ensemble classifier, FLD appeared to have the advantage over ensemble classifier in dealing with low-dimensional feature sets. In this case, the detection by applying ensemble classifier to absNJ and CC-absNJ feature sets may have been impaired due to no optimal base learners obtained. The ensemble classifier may be much better than FLD in dealing with high-dimensional features, in terms of testing accuracy or in terms of computational efficiency, or both.

Detecting Doctored Photos of Inpainting on the Same Quantization

Figures 7A, 7B, 7C:
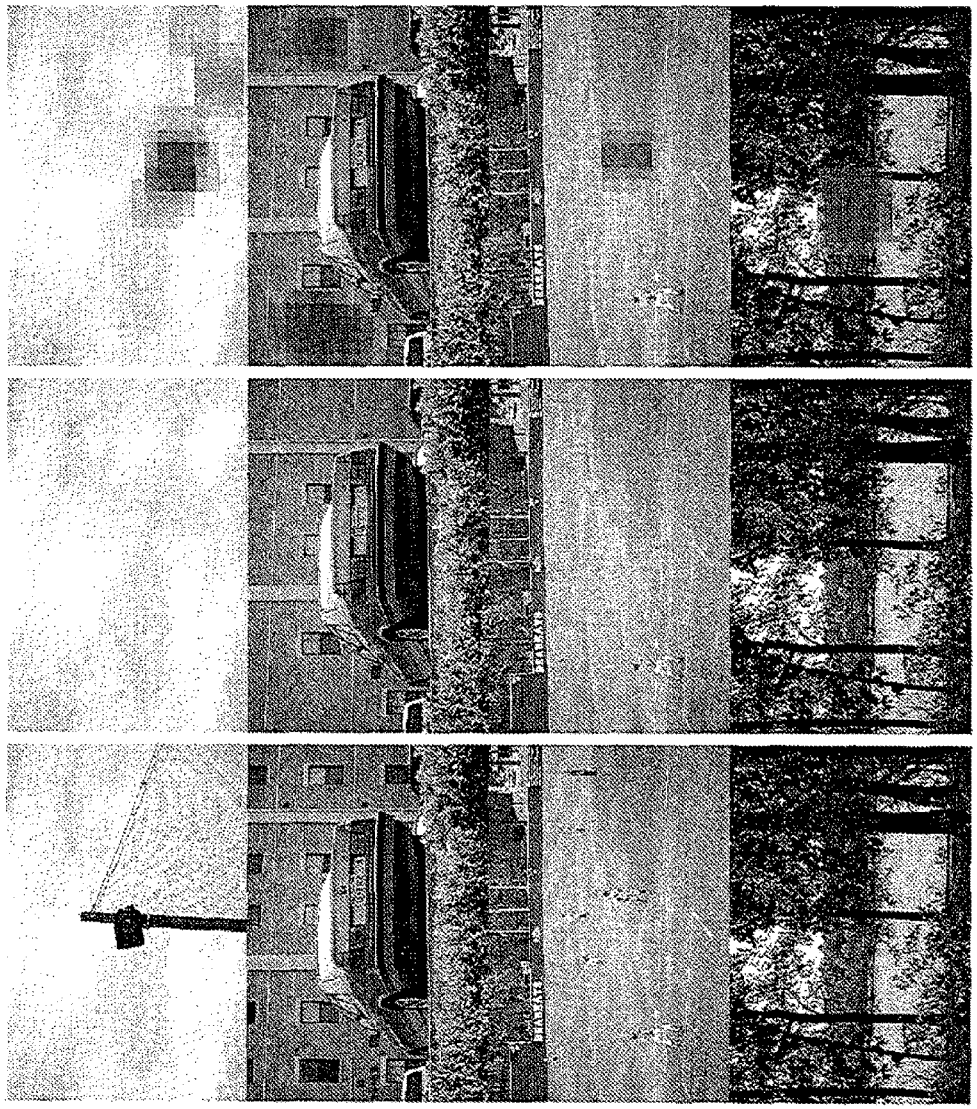
FIG. 7A shows untouched photos.
FIG. 7B shows doctored versions of the photos of FIG. 7A.
FIG. 7C shows the detection results for the photos of FIGS. 7A and 7B.

The experimental results shown in Table 8 are based on 9,707 untouched 256×256 JPEG images and 6,379 doctored 256×256 JPEG images. 50% images were randomly selected from both classes, and a classification model constructed with the ensemble classifier. Several additional doctored photos were then tested on the same quantization. Starting from the upper left corner, each 256×256 region was scanned by the step of 128 along horizontal direction from the left to the right. The start point was then moved away from the left upper corner by being translated down by the step of 128 along vertical direction. Each 256×256 region was scanned at the step of 128 along horizontal direction from the left to the right, and so on. 89,600-dimensional R-absNJ features were extracted from each 256×256 region. The previously constructed ensemble model was applied for detection. FIG. 7 demonstrates untouched photos (on the left) and doctored (on the middle). The detection results are shown (on the right). The tampering areas detected are squared. The results show that methods as described herein may be effective in detecting and exposing approximate forged areas. The results are plausible since the detection is directly based on the classification model that was used to discriminate the forged JPEG images of the pixels at least 35% modified from untouched JPEG images. In certain embodiments, a classification model considers different sizes of tampering area in JPEG images and including more training samples.

Figure 8:
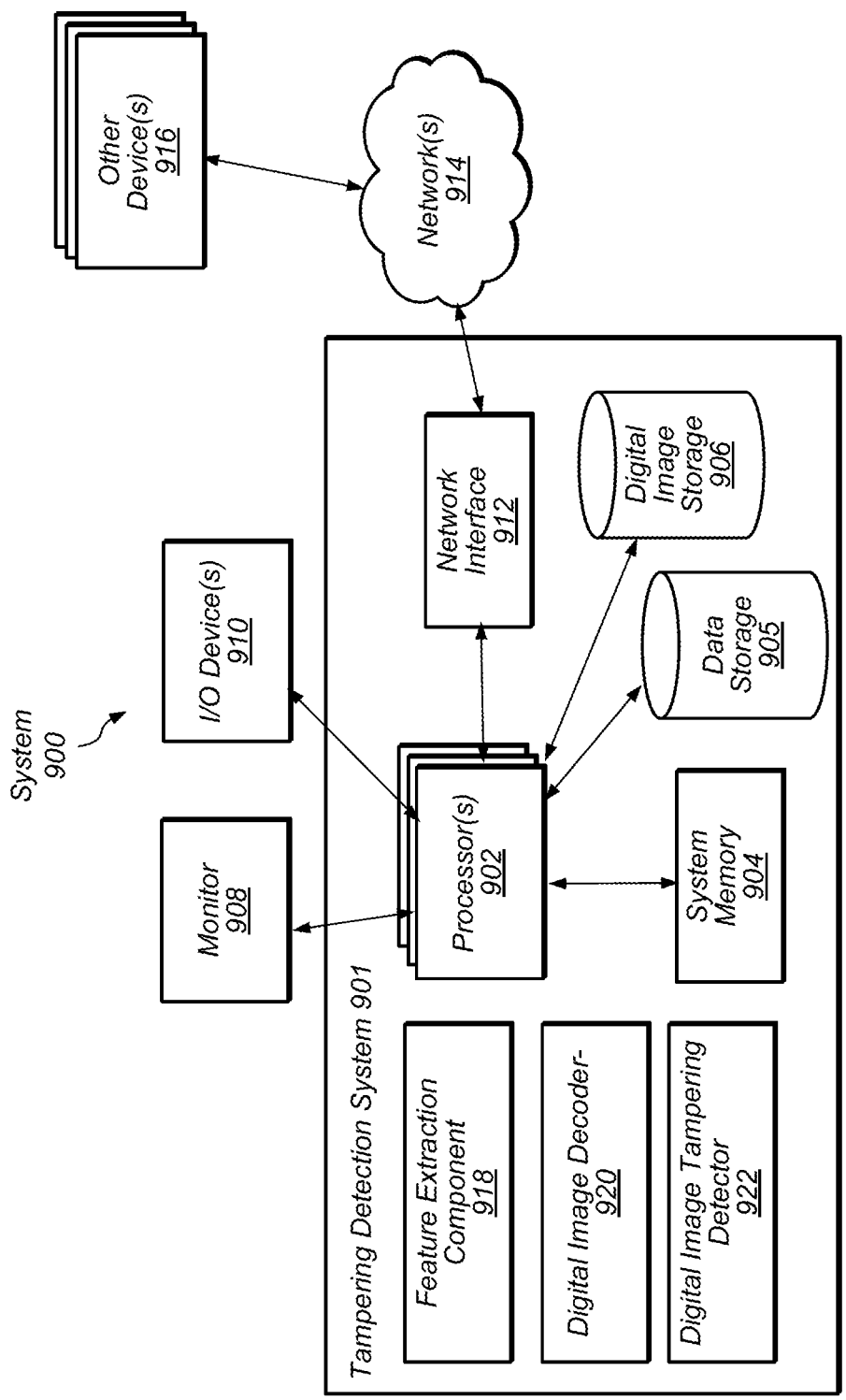
FIG. 8 illustrates a computer system that may be used to implement detection of down-recompression and inpainting forgery in various embodiments.

FIG. 8 illustrates a computer system that may be used in various embodiments to implement detection of image tampering, including, in various embodiments, tampering based on down-compression or inpainting. System 900 includes tampering detection system 901. Tampering detection system 901 includes one or more processors 902, system memory 904, data storage device 905, and digital image storage device 906. Program instructions may be stored on system memory 904. Processors 902 may access program instructions on system memory 904. Processors 902 may access data (for example, for computations) on data storage device 905 and digital image data stored on digital image storage device 906. Users may be provided with information from system 900 by way of monitor 908. Users interact with computer system 900 by way of I/O devices 910. An I/O device 910 may be, for example, a keyboard or a mouse. Computer system 900 may include, or connect with, other devices 916. Elements of computer system 900 may connect with other devices 916 by way of network 914 via network interface 912. Network interface 912 may be, for example, a network interface card. In some embodiments, messages are exchanged between computer system 900 and other devices 916, for example, via a transport protocol, such as internet protocol.

In the embodiment shown in FIG. 8, tampering detection system 901 includes digital image feature extraction component 918, digital image decoder 920, and digital image tampering detector 922. Digital image feature extraction component 918 may extract neighboring joint density features from a digital image under scrutiny (for example, as described above relative to FIGS. 1-7. The digital image may be retrieved from digital image storage device 906. Digital image decoder 920 may decode the digital image. In some embodiments, a digital image or portion of a digital image is decoded into a spatial domain. Digital image tampering detector 922 may detect tampering in digital images under scrutiny. Tampering detection may include, in various embodiments described above relative to FIGS. 1-7, including rich feature mining, application of an ensemble classifier, applying a Fisher linear discriminant, or combinations thereof. Each of digital image feature extraction component 918, digital image decoder 920, and digital image tampering detector 922 may be implemented in one or more computing devices.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of detecting inpainting tampering in a compressed digital image, comprising:
   extracting two or more first rich neighboring joint density features from a digital image under scrutiny, wherein at least two of the first rich neighboring joint density features are each extracted according to different respective frequency components of a discrete cosine transform (DCT) of a subset of pixels of the digital image under scrutiny;
   extracting two or more second rich neighboring joint density features from an original digital image, wherein at least two of the second rich neighboring joint density features are each extracted according to different respective frequency components of a DCT of a subset of pixels of the original digital image;
   decoding the digital image under scrutiny and the original digital image to a spatial domain; and
   detecting inpainting tampering in the digital image under scrutiny based on at least one difference in one or more of the first rich neighboring joint density features and one or more of the second rich neighboring joint density features of the original digital image.

2. The method of claim 1, wherein detecting tampering in the digital image under scrutiny comprises detecting inpainting forgery in the same quantization.

3. The method of claim 1, wherein detecting tampering in the digital image comprises applying a Fisher linear discriminant.

4. The method of claim 1, wherein at least a portion of the rich neighboring joint density features are determined under a shift recompression version.

5. The method of claim 1, wherein the digital image is a JPEG image.

6. The method of claim 1, wherein the digital image under scrutiny is encoded with the same quantization matrix as the original digital image.

7. The method of claim 1, wherein detecting tampering in the digital image comprises applying an ensemble classifier.

8. A system, comprising:
   a tampering detection system implemented on one or more computing devices, comprising a digital image feature extraction component, a digital image decoder, and a tampering detector, wherein the digital image feature extraction component is configured to implement:
   extracting two or more first rich neighboring joint density features from a digital image under scrutiny, wherein at least two of the first rich neighboring joint density features are each extracted according to different respective frequency components of a discrete cosine transform (DCT) of a subset of pixels of the digital image under scrutiny;
   extracting two or more second rich neighboring joint density features from an original digital image, wherein at least two of the second rich neighboring joint density features are each extracted according to different respective frequency components of a DCT of a subset of pixels of the original digital image;
   wherein the digital image decoder is configured to implement:
      decoding the digital image under scrutiny and the original digital image to a spatial domain; and
   wherein the digital image tampering detector is configured to implement:
      detecting inpainting tampering in the digital image under scrutiny based on at least one difference in one or more of the first rich neighboring joint density features and one or more of the second rich neighboring joint density features of the original digital image.

9. A method of detecting down-recompression in a compressed digital image, comprising:
   extracting two or more first rich neighboring joint density features from the compressed digital image, wherein at least two of the first rich neighboring joint density features are each extracted according to different respective frequency components of a discrete cosine transform (DCT) of a subset of pixels of the digital image under scrutiny;
   determining one or more values associated with the two or more first rich neighboring joint density features;
   extracting two or more second rich neighboring joint density features from a second image related to the compressed digital image, wherein at least two of the second rich neighboring joint density features are each extracted according to different respective frequency components of a DCT of a subset of pixels of the original digital image;
   determining one or more values associated with the second rich neighboring joint density features; and
   detecting down-recompression in the compressed digital image based on at least one difference between values associated with one or more of the first rich neighboring joint density features and values associated with one or more of the second rich neighboring joint density features.

10. The method of claim 9, wherein detecting tampering in the digital image comprises applying a Fisher linear discriminant.

11. The method of claim 9, wherein the at least a portion of the features are determined according to different frequency coordinates in a DCT domain and under a shift recompression version.

12. The method of claim 9, wherein detecting tampering comprises distinguishing between single compression and down compression.

13. The method of claim 9, wherein detecting tampering comprises detecting at least one aligned down-compression.

14. The method of claim 9, wherein detecting tampering comprises detecting at least one misaligned down-compression.

15. The method of claim 9, wherein detecting tampering in the digital image comprises applying an ensemble classifier.

* * * * *